US 8,245,818 B2

(12) United States Patent
Alecu

(10) Patent No.: US 8,245,818 B2
(45) Date of Patent: Aug. 21, 2012

(54) GAS TURBINE OIL SCAVENGING SYSTEM

(75) Inventor: Daniel T. Alecu, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 646 days.

(21) Appl. No.: 11/876,859

(22) Filed: Oct. 23, 2007

(65) Prior Publication Data

US 2009/0101444 A1 Apr. 23, 2009

(51) Int. Cl.
*F01M 9/06* (2006.01)

(52) U.S. Cl. ............... 184/11.2; 184/6.11; 123/572

(58) Field of Classification Search ............ 184/6.11, 184/6.12, 7.4, 10, 11.2; 123/572
See application file for complete search history.

(56) References Cited

U.S. PATENT DOCUMENTS

| | | | |
|---|---|---|---|
| 2,388,523 A | 11/1945 | Buechel | |
| 2,571,166 A | 10/1951 | Rossetto | |
| 2,833,374 A | 5/1958 | Glasser | |
| 3,047,208 A | 7/1962 | Coanda | |
| 3,722,624 A | 3/1973 | Buckland | |
| 3,811,254 A | 5/1974 | Amelio | |
| 4,037,991 A * | 7/1977 | Taylor | 417/80 |
| 4,153,141 A | 5/1979 | Methlie | |
| 4,344,506 A | 8/1982 | Smith | |
| 4,353,435 A * | 10/1982 | Abrams et al. | 184/6.26 |
| 4,451,200 A | 5/1984 | Libertini et al. | |
| 4,465,427 A | 8/1984 | Libertini et al. | |
| 4,531,358 A | 7/1985 | Smith | |
| 4,576,001 A | 3/1986 | Smith | |
| 4,683,714 A | 8/1987 | Thebert | |
| 4,767,281 A | 8/1988 | Sailer | |
| 4,787,271 A | 11/1988 | Brogdon | |
| 4,858,427 A | 8/1989 | Provenzano | |
| 4,891,934 A | 1/1990 | Huelster | |
| 5,429,208 A | 7/1995 | Largillier et al. | |
| 5,611,661 A * | 3/1997 | Jenkinson | 415/112 |
| 5,806,630 A * | 9/1998 | Bernal | 184/6.26 |
| 6,237,322 B1 | 5/2001 | Rago | |
| 6,438,938 B1 | 8/2002 | Burkholder et al. | |
| 6,516,618 B1 | 2/2003 | Bock | |
| 6,865,963 B2 * | 3/2005 | Takanohashi et al. | 74/89.44 |
| 7,118,336 B2 | 10/2006 | Waddleton | |
| 7,163,086 B2 | 1/2007 | Care et al. | |
| 7,225,626 B2 | 6/2007 | Robinson et al. | |
| 2006/0054404 A1 * | 3/2006 | El-Ibiary | 184/6 |

(Continued)

FOREIGN PATENT DOCUMENTS

DE 102006023580 11/2007

(Continued)

OTHER PUBLICATIONS

European Search Report dated Apr. 11, 2011 issued by the European Patent Office with respect to Applicant's corresponding European application No. EP 08252826.6-1263 / 2053206.

(Continued)

*Primary Examiner* — Michael Mansen
*Assistant Examiner* — Robert T Reese
(74) *Attorney, Agent, or Firm* — Norton Rose Canada LLP

(57) ABSTRACT

A method for scavenging oil in a gas turbine engine comprises using a driving fluid flow to drive a flow of a fluid collected in an oil system of the engine to pass through an ejector and then the driven flow of the fluid is directed to be discharged into an oil tank.

13 Claims, 4 Drawing Sheets

U.S. PATENT DOCUMENTS

2009/0071120 A1* 3/2009 Bulman .......................... 60/204

FOREIGN PATENT DOCUMENTS

| EP | 294064 | 12/1988 |
|----|--------|---------|
| EP | 1582703 | 10/2005 |
| JP | 05-004696 | 1/1993 |
| JP | 05-294398 | 11/1993 |

OTHER PUBLICATIONS

HMC-Brauer Limited, Air Movers (Air Amplifiers), catalogue pp. 1-44, found at website: http://www.kewesta.de/Portals/_kws/Documents/Airmovers_EN.pdf, Copyright date 1999.

* cited by examiner

GAS TURBINE OIL SCAVENGING SYSTEM

TECHNICAL FIELD

The invention relates generally to gas turbine engines and, more particularly, to an improved gas turbine oil scavenging system.

BACKGROUND OF THE ART

Gas turbine engines have oil systems to meet the needs of rotating components of the engines for continuous oil flows for cooling and lubricating those rotating components. An oil system in a gas turbine engine conventionally includes an oil supply system for delivering oil from an oil source such as an oil tank, to various locations within the gas turbine engine, and an oil scavenging system for recovering used oil from the various locations in the engine and discharging the recovered used oil back into the source such as the oil tank. In a conventional scavenging oil system, conventional displacement pumps which are driven by a dedicated gear train, are used as scavenging pumps. Those displacement pumps and the dedicated gear train are relatively oversized and overweighted in the environment of a gas turbine engine, particularly when used for aircraft.

Accordingly, there is a need to provide an improved gas turbine oil scavenging system.

SUMMARY OF THE INVENTION

In one aspect, the present invention provides a method for scavenging oil in a gas turbine engine, which comprises using a driving fluid flow to drive a flow of a fluid collected in an oil system of the gas turbine engine to pass through an ejector, and directing the driven flow of the fluid to be discharged into an oil tank.

In another aspect, the present invention provides an oil scavenging system of a gas turbine engine which comprises an oil tank; an oil supply pump for pumping oil from the oil tank to an oil supply system of the gas turbine engine; and means for using a fluid flow to drive a flow of used oil or a flow of a mixture of air and used oil collected in the gas turbine engine, to pass through at least one scavenging passage into the oil tank.

In another aspect, the present invention provides an oil scavenging system in a gas turbine engine which comprises an oil tank; an oil supply pump for pumping oil from the oil tank to an oil supply system of the gas turbine engine; a first scavenging passage for directing a flow of used oil collected in a first engine bearing cavity; a second scavenging passage for directing a flow of exhaust air collected in the first engine bearing cavity; an oil-oil ejector supplied with an oil flow diverted from an output of the oil supply pump to drive the flow of the used oil collected in the first engine bearing cavity, to pass through the first scavenging passage into the oil tank; a third scavenging passage for directing a flow of a mixture of air and used oil collected in a second engine bearing cavity; a first air/oil separator for separating respective oil and air from the mixture of air and used oil directed through the third scavenging passage, the separated oil being discharged into the oil tank; a fourth scavenging passage for directing a flow of a mixture of air and used oil collected in a third engine bearing cavity; an air-mix ejector supplied with the separated air from the first air/oil separator to drive the flow of the mixture of air and used oil collected in the third engine bearing cavity to pass through the fourth scavenging passage into the oil tank; a second air/oil separator for separating oil contained in both the flow of exhaust air directed through the second scavenging passage and an air flow vented from the oil tank, the separated oil being directed into the first scavenging passage at a location upstream of the oil-oil ejector; and an air-air ejector supplied with an air flow to drive a flow of exhaust air from the second air/oil separator for ventilation.

In a still further aspect, the present invention provides a method for ventilating an oil scavenging system in a gas turbine engine which comprises steps of directing a flow of exhaust air from an air/oil separator in the oil scavenging system to an air-air ejector; and supplying a bleed air flow from the gas turbine engine to the air-air ejector to drive the flow of exhaust air to pass through the air-air ejector to be vented into the atmosphere in order to de-pressurize the air/oil separator at a low level of engine power.

Further details of these and other aspects of the present invention will be apparent from the detailed description and drawings included below.

DESCRIPTION OF THE DRAWINGS

Reference is now made to the accompanying drawings depicting aspects of the present invention, in which.

DETAILED DESCRIPTION OF THE EMBODIMENTS

Figure 1:
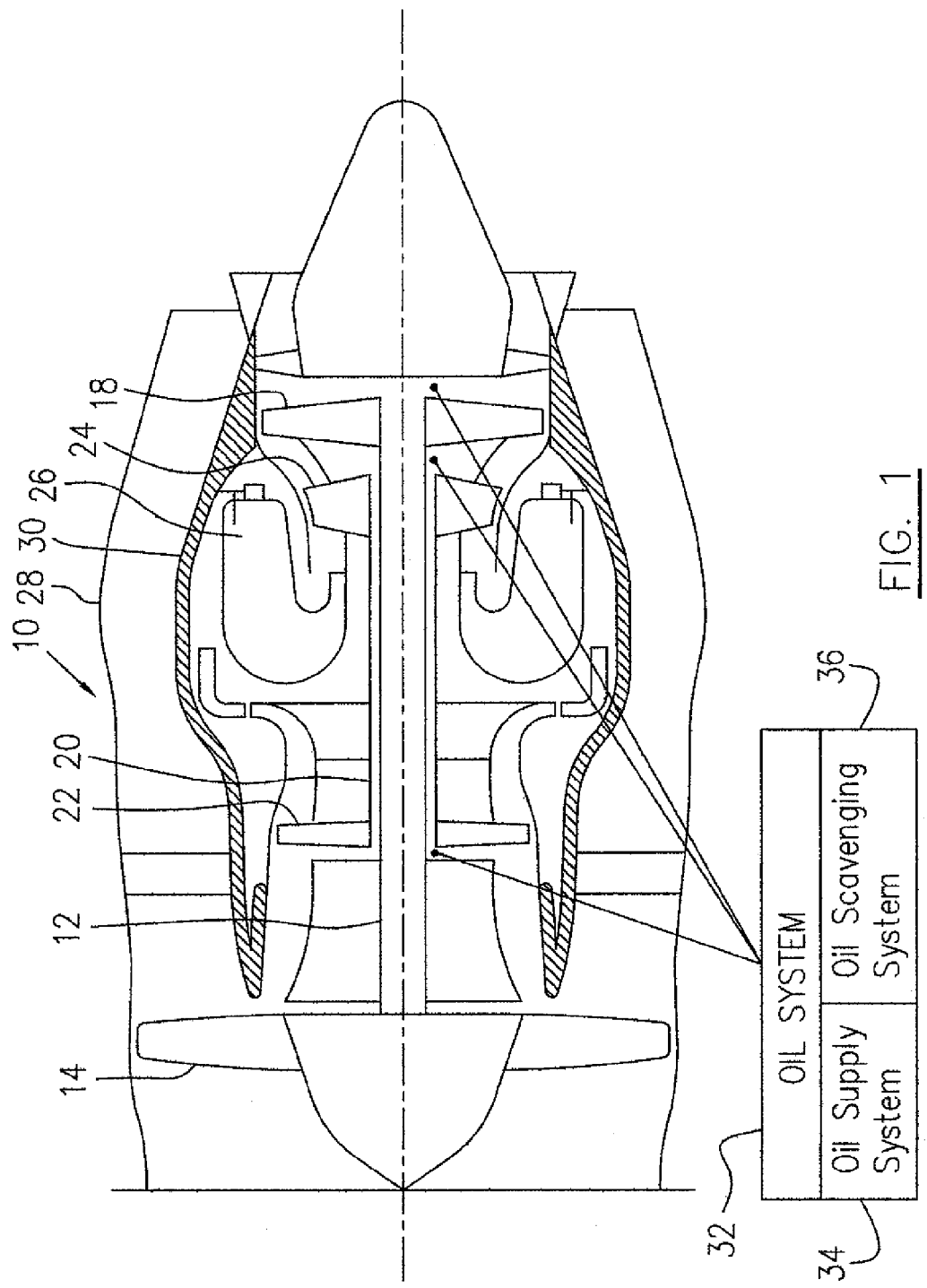
FIG. 1 is a schematic cross-sectional view of a turbofan gas turbine engine having an oil system including an oil supply system and an oil scavenging system.

FIG. 1 illustrates an exemplary gas turbine engine 10 which includes an outer bypass duct 28, a gas generator case 30, a low pressure spool assembly seen generally at 12 which includes a fan assembly 14 and a low pressure turbine assembly 18, and a high pressure spool assembly seen generally at 20 which includes a high pressure compressor assembly 22 and a high pressure turbine assembly 24. The gas generator case 30 surrounds the low and high pressure spool assemblies 12 and 20 in order to define a main fluid path (not indicated) therethrough, which includes a combustor 26.

Referring to FIGS. 1-4, the gas turbine engine 10 includes an oil system 32 for circulating cooling and lubricant oil within the engine. The oil system 32 includes an engine oil supply system (E.O.S.S.) 34 for delivering oil from a source such as an oil tank 38 to various locations in the engine, for example, to a low pressure turbine bearing cavity (L.P.T.B.C.) 40, a high pressure turbine bearing cavity 42, a compressor bearing cavity (C.B.C.) 44, etc., for cooling and lubrication of rotating components of the engine. The oil system 32 further includes an oil scavenging system 36 (36a, 36b or 36c) for recovering used oil at those various locations within the engine, and discharging the recovered used oil into sources such as the oil tank 38.

Figure 2:
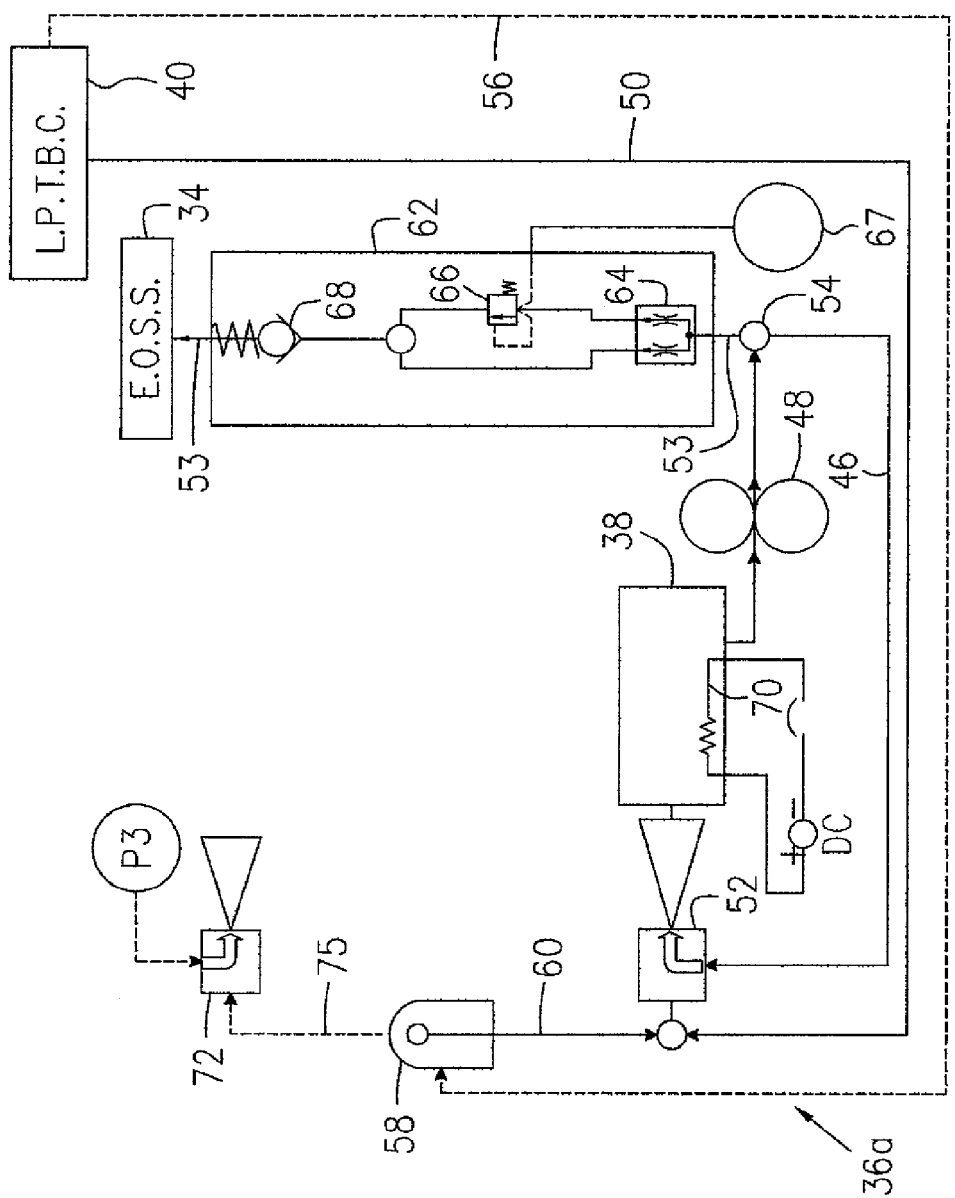
FIG. 2 is schematic illustration showing an oil scavenging system used in the gas turbine engine of FIG. 1, according to one embodiment of the present invention.
Figure 3:
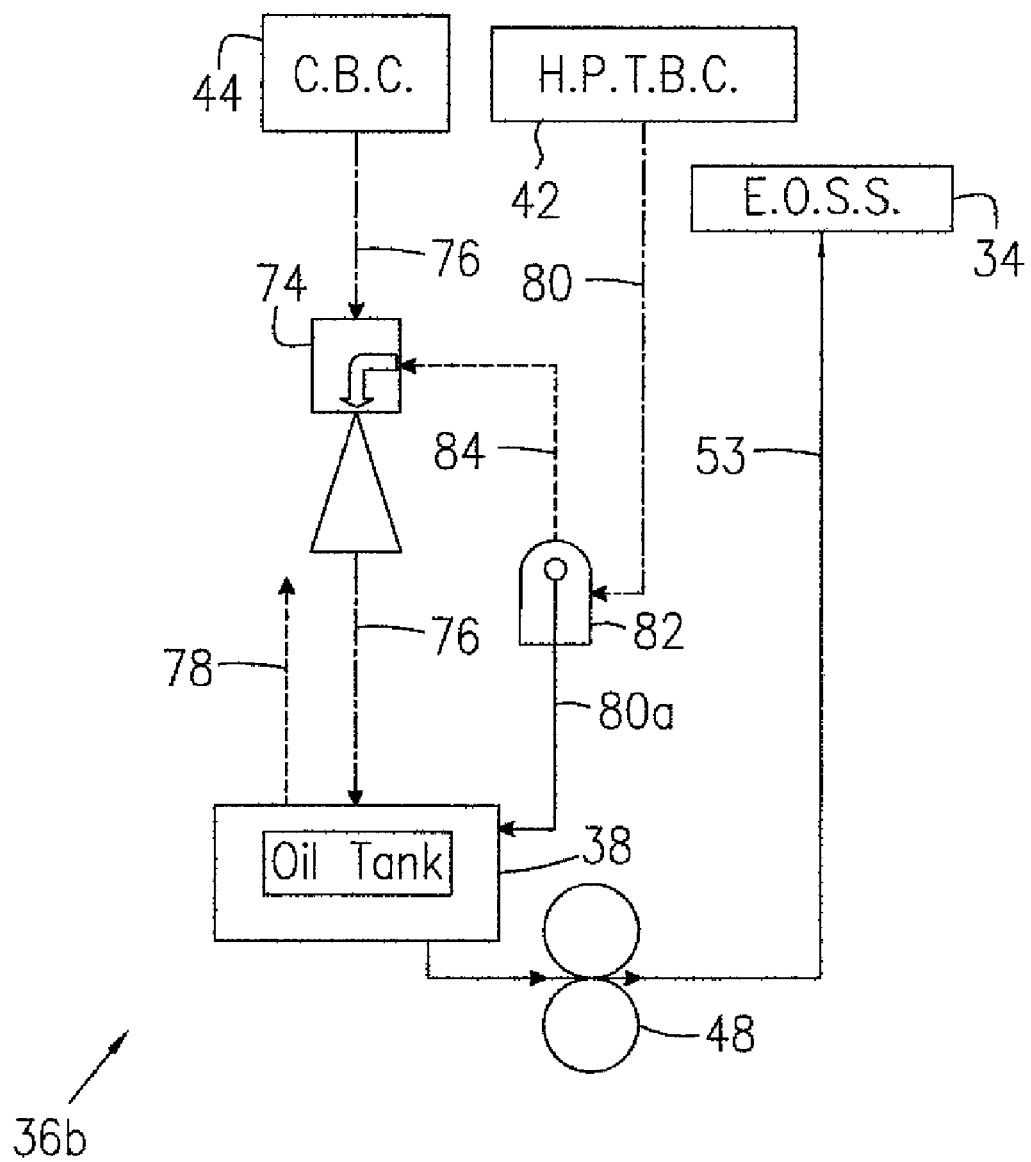
FIG. 3 is a schematic illustration showing an oil scavenging system used in the gas turbine engine of FIG. 1, according to another embodiment of the present invention.
Figure 4:
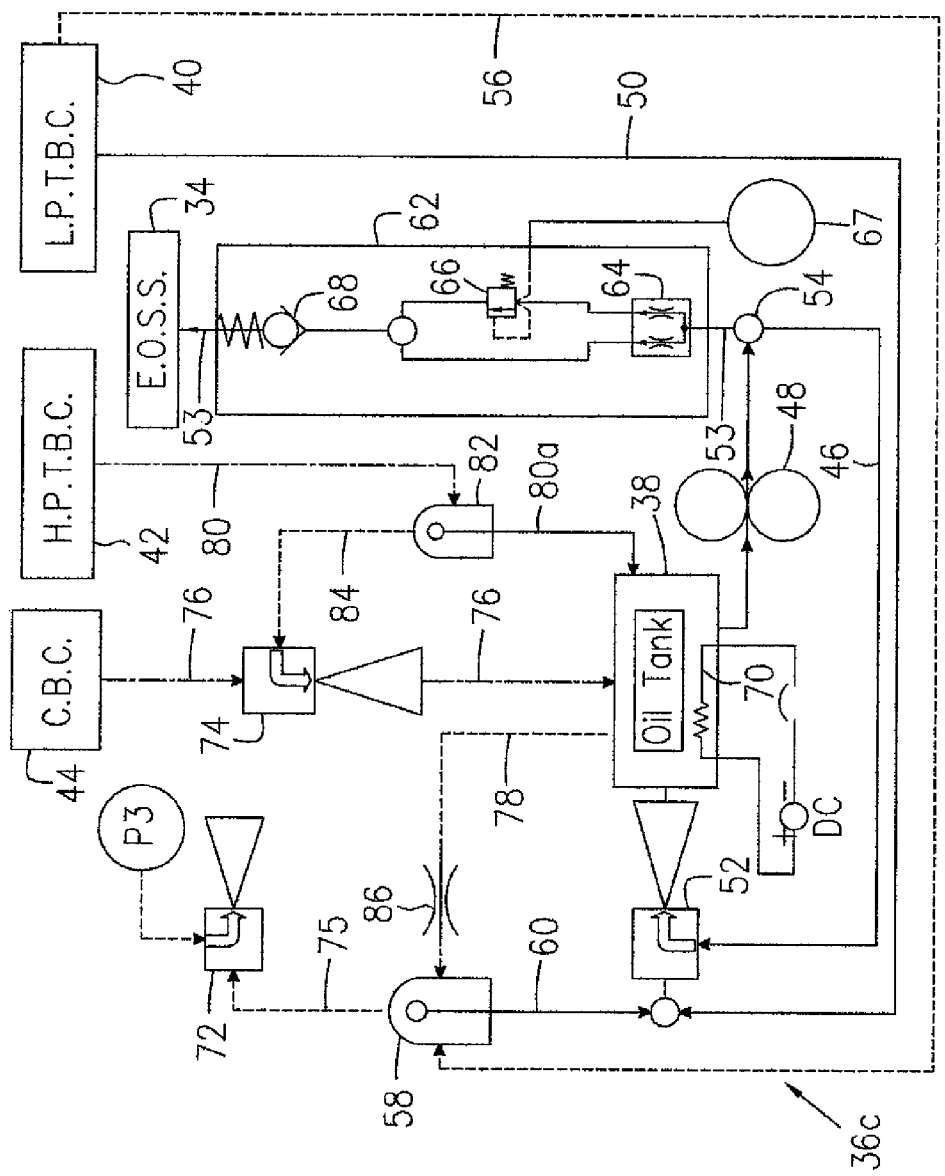
FIG. 4 is a schematic illustration showing an oil scavenging system used in the gas turbine engine of FIG. 1, according to another embodiment of the present invention.

For convenience and clarification of illustration, in FIGS. 2-4 solid lines with arrows indicate oil flows, dashed lines with arrows indicate air flows which may or may not contain oil mist and fine oil particles and dot-dash lines with arrows indicate flows of a substantial mixture of air and used oil.

Referring particularly to FIG. 2, an oil scavenging system 32a is described in detail in accordance with one embodiment of the present invention. In the oil scavenging system 36a, an oil flow 46 from an oil supply pump 48 is used to drive a flow of used oil collected in one location, for example in the low pressure turbine bearing cavity (L.P.T.B.C.) 40, to pass through an oil scavenging passage 50 into the oil tank 38, which is achieved by means of an oil-oil ejector 52. The oil-oil ejector 52 is one type of fluid ejector known in the art and will not be further described herein.

The oil supply pump 48 also functions to provide an oil flow 53 through the engine oil supply system 34 to the engine. An oil-oil ejector motive flow supply manifold 54 may be used to divert the output of the oil supply pump 48 into the respective oil flows 46 and 53.

The oil scavenging system 36a may include an air exhaust passage 56 for discharging a flow of exhaust air collected from the same location, i.e. the low pressure turbine bearing cavity 40. However, oil particles may be contained in the exhaust air and an air/oil separation process may be provided prior to venting of the collected exhaust air. An air/oil separator 58 may therefore be installed in the oil scavenging system 36a and operatively connected to the air exhaust passage 56. The oil separated by the air/oil separator 58 may be directed by an oil passage 60, into the oil scavenging passage 50, for example, via a manifold (not indicated) located upstream of the oil-oil ejector 52, such that the separated oil from the air/oil separator 58 is also driven through the oil-oil ejector 52, into the oil tank 38. The air separated by the air/oil separator 58 may be ventilated directly to the atmosphere, as one option.

A two-stage valve assembly 62 may be optionally installed in the oil scavenging system 36a, between the oil-oil ejector motive flow supply manifold 54 and the engine oil supply system 34, for adjusting the oil flow 53 in a variable volume from the output of the oil supply pump 48, to the engine oil supply system 34. The two-stage valve assembly 62, for example, includes a flow divider 64 and an external-pressure-referenced release valve 66 such that the oil flow 53 can always be directed through the two-stage valve assembly 62 via a bypass passage (not indicated) therein, to the engine oil supply system 34, and an additional volume of the oil flow 53 can be directed through the two-stage valve assembly 62 to the engine oil supply system 34 via the external-pressure-referenced release valve 66 which opens in response to a backpressure increase in the engine oil supply system 34 when the engine is operated at a higher engine power level. The external-pressure-referenced release valve 66 is known in the art and will not be further described herein. Ambient pressure may be used as the external pressure reference as indicated by numeral 67. The two-stage valve assembly 62 advantageously keeps the oil-oil ejector motive flow supply manifold 54 pressurized to provide a consistent driving oil flow to the oil-oil ejector 52 while adjusting the variable amount of oil flow 53 to the engine under various engine operation conditions, thereby ensuring optimal oil supply for both the oil-oil ejector 52 and the rest of the engine.

A check valve 68 may be optionally included in the two-stage valve assembly 62 at an outlet of the assembly, in order to prevent an air return flow from the engine oil supply system 34 into the oil supply pump 48 and/or through oil flow 46 into the oil-oil ejector 52.

A heater for heating the oil in the oil tank 38 such as an oil tank intermittent heater 70 may be optionally included in the oil scavenging system 36a in order to ensure a reduced pressure load in the engine oil supply system 34 and an adequate performance of the oil/oil ejector 52 during a cold engine start process.

The oil heater 70 is active only prior to engine start in order to reduce the negative impact that high viscosity oil has on oil-oil ejector performance and to reduce pressure in the oil supply system 34. The pre-heated oil warms up the oil-oil ejector 52 and fills up the oil supply system 34 during engine start. Cooler engine parts cool down the oil initially, thereby delaying the arrival of oil into the bearing cavities. The engine bearings run dry of oil shortly after engine light-up, thereby warming up rapidly and sending warm air down the oil scavenging system. The warm air accelerates the oil system warm-up, including that of the air/oil separator 58. By the time the oil starts to accumulate in the air/oil separator 58, the oil scavenging system is sufficiently warm to allow normal functioning of the oil-oil ejector and to reduce pressure losses in the oil scavenging system.

As an alternative to venting the separated air exhaust from the air/oil separator 58 directly to the atmosphere, an air-air ejector 72 may be provided for venting of the oil scavenging system 36a. The air-air ejector 72 which is known in the art and will not be further described herein, is supplied with an air flow from a pressurized air source such as a P3 bleed air, as indicated in FIG. 2, to drive an exhaust air flow 75 from the air/oil separator 58 to pass through the air-air ejector 72 for venting to the atmosphere. The air-air ejector 72 is adapted to de-pressurize the air/oil separator 58 at a low engine power level while, at medium and high engine power levels, the ejector limits the exhaust air flow 75, which ensures correct oil system pressurization; towards that end, the air-air ejector 72 throat area is dimensioned such that it ensures subsonic flow at low power and supersonic flow at high power, i.e. "chocked regime".

It should be noted that in another aspect of the present invention, the air-air ejector 72 may be used as a ventilation apparatus installed in other oil scavenging systems which may include a main air/oil separator, in order to de-pressurize the air/oil separator during a low level of engine power, thereby ensuring an adequate venting of the engine oil system and thus the gas turbine engine bearing cavities.

The low pressure turbine bearing cavity (L.P.T.B.C.) 40 illustrated in FIG. 2 is one example of a plurality of locations in the engine where oil for lubrication and cooling may be introduced and discharged. Therefore, the oil scavenging system 36a can be used to scavenge oil and vent exhaust air from other locations in the engine.

Referring to FIG. 3, an oil scavenging system 36b used in the gas turbine engine of FIG. 1 according to another embodiment of the present invention is illustrated, and components and features therein similar to those in the oil scavenging system 36a of FIG. 2 are indicated by similar numerals and may not be redundantly described in detail herein. In the oil scavenging system 36b, an air-mix ejector 74 supplied with an air flow which may be directed from any air source under pressure in the engine, is connected in an air and oil scavenging passage 76 to drive a flow of a mixture of air and used oil collected in a location in the engine such as a compressor bearing cavity (C.B.C.) 44, to pass through the air and oil scavenging passage 76 and the air-mix ejector 74 into the oil tank 38. The mixture of air and used oil may be separated within the oil tank 38 and the oil stored in the oil tank 38 is pumped by the oil supply pump 48 into the engine oil supply system 34, as indicated by the oil flow 53 in FIG. 3. The air separated from the mixture of air and used oil within the oil tank 38, may be vented directly to the atmosphere (indicated as an air flow 78). Nevertheless, the air flow 78 vented from the oil tank 38 may still contain oil mist or fine oil particles and therefore as an alternative, the air flow 78 from the oil tank 38 may be directed to an air/oil separator, for example, the air/oil separator 58 shown in FIG. 2, for a further separation processing. An example of such further separation processing will be described in a further embodiment with reference to FIG. 4 hereinafter.

The oil scavenging system 36b may further include an air and oil scavenging passage 80 for directing a flow of a mixture of air and used oil collected in another location in the engine such as the high pressure turbine bearing cavity (H.P.T.B.C.) 42, into an air/oil separator 82 for an air/oil separation process. The oil separated by the air/oil separator 82 is further directed through an oil scavenging passage 80a into the oil tank 38. Air separated by the air/oil separator 82 may be optionally used as an air flow 84 supplied under pressure to the air-mix ejector 74 as a driving fluid flow to drive the flow of the mixture of air and used oil to pass through the air and oil scavenging passage 76.

An in-line oil separator which is known in the art and will not be further described, may be conveniently inserted into a high pressure turbine bearing cavity scavenging line (not indicated) to function as air/oil separator 82 and therefore, the passages 80 and 80a from the respective upstream and downstream sections of this high pressure turbine bearing cavity scavenging line.

Referring now to FIG. 4, there is an oil scavenging system 36c according to a further embodiment of the present invention, which substantially combines the previously described embodiments of FIGS. 2 and 3. The features and components similar to those shown in FIGS. 2 and 3 are indicated by similar numerals and will not be redundantly described in detail.

In the oil scavenging system 36c there are a scavenging passage 50 for directing a flow of used oil collected, for example in the low pressure turbine bearing cavity (L.P.T.B.C.) 40 and an air exhaust passage 56 for directing a flow of exhaust air collected in the same location, i.e. the low pressure turbine bearing cavity 40. An oil-oil ejector 52 supplied with an oil flow 46 diverted for example by a oil-oil ejector motive flow supply manifold 54 from an output of the oil supply pump 48 drives the flow of used oil collected in the low pressure turbine bearing cavity 40, to pass through the oil scavenging passage 50 and the oil-oil ejector 52, into the oil tank 38. An air/oil separator 58 is used to receive the flow of air exhaust through the air exhaust passage 56 and to separate oil contained within the exhaust air. The oil separated by the air/oil separator 58, is directed by an oil scavenging passage 60 into the oil scavenging passage 50 at a location upstream of the oil-oil ejector 52, to be driven into the oil tank 38. An air exhaust flow 75 discharged from the air/oil separator 58 is driven to pass through an air-air ejector 72 to be vented to the surrounding atmosphere. The air-air ejector 72 is supplied, for example, with a flow of P3 bleed air and functions similarly to the air-air ejector 72 of the oil scavenging system embodiment 36a described with reference to FIG. 2. Nevertheless, the air-air ejector 72 may also be optional to this embodiment.

The oil scavenging system 36c further includes an air and oil scavenging passage 76 for directing a flow of a mixture of air and used oil collected for example in the compressor bearing cavity (C.B.C.) 44. An air-mix ejector 74 is connected in the air and oil scavenging passage 76 and is supplied with an air flow 84 under pressure to drive the flow of the mixture of air and used oil collected in the compressor bearing cavity 44, to pass through the scavenging passage 76 and the air-mix ejector 74, into the oil tank 38.

A scavenging line including an upstream air and oil scavenging passage 80 and a down stream oil scavenging passage 80a is used for directing a flow of air and used oil collected for example in the high pressure turbine bearing cavity (H.P.T.B.C.) 42. An in-line oil separator 82 may be inserted in the scavenging line in a location between the upstream air and oil scavenging passage 80 and the downstream oil scavenging passage 80a such that the mixture of air and used oil flowing through the upstream passage 80 is separated in the in-line air/oil separator 82 and the separated oil is discharged through the downstream passage 80a into the oil tank 38. Air separated from the in-line air/oil separator 82 is under pressure and may be used as an air flow 84 to drive the air-mix ejector 74. The air flow 78 vented from the oil tank 38, is not directly discharged to the atmosphere in this embodiment. Instead, the air flow 78 vented from oil tank 38, is directed through a restrictor 86 into the air/oil separator 58 for further separating oil mist and fine oil particles contained within the vented air flow 78. The air separated from the vented air flow 78 is discharged from the air/oil separator 58 together with the air exhaust flow 75 exhausted through the air-air ejector 72 to be vented to the surrounding atmosphere.

The oil flow 53 diverted from the output of the oil supply pump 48 through the oil-oil ejector motive flow supply manifold 54, may be directly introduced into the engine oil supply system 34, similar to the previously described embodiment of FIG. 3. Alternatively, the oil flow 53 may be directed into the engine oil supply system 34 through the two-stage valve assembly 62 which is described with reference to the previous embodiment shown in FIG. 2. The components which are indicated by similar numerals and features of the two-stage valve assembly 62 will not be redundantly repeated herein.

It is understood that all options and alternatives described in the individual embodiments of FIGS. 2 and 3 are available and applicable in the embodiment of FIG. 4.

The present invention provides a system and method which advantageously provides adequate ventilation of an oil scavenging system and thus engine bearing cavities, and which provides continuous, uninterrupted and complete recovery of oil used for engine cooling and lubrication within the engine flight envelope while minimizing the oil scavenging system weight, complexity and power consumption. For example, the separation of air and used oil upstream of the scavenging ejectors and the use of separate air and oil ejectors, allow the ejectors to function under optimal conditions. The two-stage oil supply valve assembly ensures an optimal supply for both the oil ejector and the rest of the engine. The separate scavenging passages for air and used oil reduce pressure losses. The oil heater eliminates extensive pressures in the oil system during a cold engine start, thereby allowing a slimmer design for all the oil system components. The oil scavenging system of the present invention does not require continuously moving parts and requires no gear train drive.

The above description is meant to be exemplary only, and one skilled in the art will recognize that changes may be made to the embodiments described without departure from the scope of the invention disclosed. For example, although a turbofan engine as shown in FIG. 1, is illustrated as an example of the application of this invention, it is understood that the oil scavenging system according to this invention, can be applied to other types of gas turbine engines. The air-mix ejector described in some embodiments may be eliminated in favour of direct blow-down scavenging for one or more engine bearing cavities. Any of the ejectors described in the various embodiments of the present invention may be replaced by Coanda effect based air movers such as that described by Henry Coanda in U.S. Pat. No. 3,047,208 issued on Jul. 31, 1962. Air-oil separators may be used for each bearing cavity. The separate scavenging passages for respective air exhaust and used oil may be used for each bearing cavity to further optimize oil distribution and individual two-stage oil supply valve assemblies may be used for each engine bearing cavity. Individual heaters may be used for the oil supply pump and the oil ejector. The air-oil separator may be of a static or centrifugal type. Still other modifications which fall within the scope of the present invention will be apparent to those skilled in the art, in light of a review of this disclosure, and such modifications are intended to fall within the appended claims.

The invention claimed is:

1. A method for scavenging oil in a gas turbine engine comprising:
    separately directing a flow of used oil and a flow of exhaust air collected in a first engine bearing cavity into first and second scavenging passages, respectively;
    diverting an oil flow from an oil supply pump, into a first oil flow supply and a second oil flow supply;
    using the first oil flow supply as a driving fluid flow to drive the flow of used oil in the first scavenging passage to pass through an oil-oil ejector, and then directing the driven flow of the used oil into an oil tank;
    directing the second oil flow supply to an engine oil supply system and increasing the second oil flow supply in response to a backpressure increase in the engine oil supply system; and
    using an air/oil separator at a location upstream of the oil-oil ejector to separate oil contained in the flow of exhaust air directed in the second scavenging passage and then driving the separated oil through the oil-oil ejector into the oil tank while discharging the separated exhaust air out of the engine.

2. The method as defined in claim 1 further comprising directing an air flow as a driving fluid flow, into an air-mix ejector to drive a flow of a mixture of air and used oil to pass through the air-mix ejector and then into the oil tank.

3. The method as defined in claim 1 further comprising directing a high pressure compressor bleed air flow into an air-air ejector to drive a flow of said separated exhaust air for ventilation.

4. The method as defined in claim 1 further comprising heating of oil in the oil tank prior to an engine start process to insure the performance of the oil-oil ejector.

5. An oil scavenging system of a gas turbine engine comprising:
    an oil tank;
    an oil supply pump for pumping oil from the oil tank to an oil supply system of the gas turbine engine;
    an oil-oil ejector supplied with an oil flow diverted from an output of the oil supply pump to drive the flow of used oil collected in one of a plurality of engine bearing cavities, to pass through at least one scavenging passage into the oil tank;
    a two-stage valve assembly connected between the oil supply pump and the oil supply system for adjusting a variable oil flow supply from the oil supply pump to the gas turbine engine thereby the oil flow to the oil-oil ejector being substantially consistent, the two-stage valve assembly including a first passage which is always open for directing an oil flow through the two-stage valve assembly and a second passage having an external-pressure-referenced release valve which opens in response to a backpressure increase in the oil supply system, to allow an additional oil flow through the two-stage valve assembly; and;
    an air/oil separator positioned upstream of the oil-oil ejector and at least one exhaust air passage extending between the one of engine bearing cavities and the oil-air separator, oil contained in air exhausted from the one of the engine bearing cavities being separated and further directed into the at least one scavenging passage upstream of the oil-oil ejector.

6. The oil scavenging system as defined in claim 5 wherein the air/oil separator is operatively connected to the oil tank to allow oil to be separated from air vented from the oil tank.

7. The oil scavenging system as defined in claim 5 further comprising an air-air ejector connected to the air/oil separator and supplied with compressed air to drive an air flow discharged from the air/oil separator for ventilation.

8. The oil scavenging system as defined in claim 5 comprising an oil-oil ejector motive flow supply manifold for diverting the output of the oil supply pump into both the two-stage valve assembly and the oil-oil ejector.

9. The oil scavenging system as defined in claim 5 wherein the two-stage valve assembly comprises a flow divider connected to the first and second passages.

10. The oil scavenging system as defined in claim 9 wherein the two-stage valve assembly comprises a check valve to prevent an air return flow.

11. The oil scavenging system as defined in claim 5 further comprising an air-mix ejector supplied with an air flow to drive the flow of the mixture of air and used oil collected in one of a plurality of engine bearing cavities, to pass through the at least one oil scavenging passage into the oil tank.

12. The oil scavenging system as defined in claim 11 further comprising an air/oil separator for separating respective oil and air from a mixture of air and used oil collected in another one of the engine bearing cavities, the separated oil being directed into the oil tank and the separated air being supplied to the air-mix ejector as the driving fluid flow.

13. The oil scavenging system as defined in claim 5 comprising an oil tank heater.

* * * * *